US010894742B2

(12) United States Patent
Gozum et al.

(10) Patent No.: US 10,894,742 B2
(45) Date of Patent: *Jan. 19, 2021

(54) REPAIR COMPOUND AND METHODS OF USE

(71) Applicant: 3M INNOVATIVE PROPERTIES COMPANY, St. Paul, MN (US)

(72) Inventors: John E. Gozum, Stillwater, MN (US); DanLi Wang, Shoreview, MN (US); Dwight B. Schoenherr, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/375,435

(22) Filed: Apr. 4, 2019

(65) Prior Publication Data
US 2019/0225543 A1 Jul. 25, 2019

Related U.S. Application Data

(63) Continuation of application No. 15/312,317, filed as application No. PCT/US2015/035055 on Jun. 10, 2015, now Pat. No. 10,273,185.

(60) Provisional application No. 62/110,762, filed on Feb. 2, 2015, provisional application No. 62/110,038, filed on Jan. 30, 2015, provisional application No. 62/015,076, filed on Jun. 20, 2014.

(51) Int. Cl.
| *C08K 7/02* | (2006.01) |
| *C04B 26/06* | (2006.01) |
| *B29C 73/02* | (2006.01) |
| *C04B 26/02* | (2006.01) |
| *C04B 26/04* | (2006.01) |
| *C04B 26/28* | (2006.01) |
| *C09D 133/08* | (2006.01) |
| *C09D 5/34* | (2006.01) |
| *C09D 7/43* | (2018.01) |
| *C09D 7/40* | (2018.01) |
| *E04G 23/02* | (2006.01) |
| *C04B 103/00* | (2006.01) |
| *C04B 111/20* | (2006.01) |
| *C04B 111/72* | (2006.01) |
| *C08K 3/013* | (2018.01) |
| *B29K 33/04* | (2006.01) |
| *B29K 509/08* | (2006.01) |
| *C04B 103/44* | (2006.01) |
| *C08K 7/28* | (2006.01) |
| *E04F 21/06* | (2006.01) |

(52) U.S. Cl.
CPC .............. *C04B 26/06* (2013.01); *B29C 73/02* (2013.01); *C04B 26/026* (2013.01); *C04B 26/04* (2013.01); *C04B 26/28* (2013.01); *C08K 7/02* (2013.01); *C09D 5/34* (2013.01); *C09D 7/43* (2018.01); *C09D 7/70* (2018.01); *C09D 133/08* (2013.01); *E04G 23/0203* (2013.01); *B29K 2033/04* (2013.01); *B29K 2509/08* (2013.01); *C04B 2103/0065* (2013.01); *C04B 2103/44* (2013.01); *C04B 2111/29* (2013.01); *C04B 2111/72* (2013.01); *C08K 3/013* (2018.01); *C08K 7/28* (2013.01); *E04F 21/06* (2013.01); *E04G 23/02* (2013.01); *Y02W 30/91* (2015.05)

(58) Field of Classification Search
CPC ....... C04B 26/06; C04B 26/026; C04B 26/04; C04B 26/28; C09D 7/43; C09D 7/70; C09D 5/34; C09D 133/08; C08K 7/02; C08K 3/013; C08K 7/28; E04G 23/023; E04G 23/0203
USPC ........................................................ 523/219
See application file for complete search history.

(56) References Cited

U.S. PATENT DOCUMENTS

| 3,365,315 | A | | 1/1968 | Beck |
| 3,709,706 | A | | 1/1973 | Sowman |
| 4,166,147 | A | | 8/1979 | Lange |
| 4,391,646 | A | | 7/1983 | Howell |
| 5,384,233 | A | | 1/1995 | Kuse |
| 5,465,881 | A | * | 11/1995 | Zwicky .................. B63C 11/52 |
| | | | | 222/389 |
| 6,221,486 | B1 | | 4/2001 | Soane |

(Continued)

FOREIGN PATENT DOCUMENTS

| GB | 2498770 | 7/2013 |
| JP | 2003-292361 | 10/2003 |

(Continued)

OTHER PUBLICATIONS

US 6,027,799 A, 02/2000, Castle (withdrawn)

(Continued)

Primary Examiner — Hannah J Pak
(74) Attorney, Agent, or Firm — Kevin Weber

(57) ABSTRACT

A repair compound for use in all applications and particularly well-suited for large hole repair. The repair compound includes a latex resin, a thickener, fibers, and a filler material. In some embodiments, the repair compound is configured to exhibit pseudoplastic-type behavior. In some embodiments, the repair compound has a density of not greater than 4.0 lbs/gal. In some embodiments, the repair compound includes hydrophobic and hydrophilic fibers of different morphologies. In some embodiments, the repair compound includes HASE-type thickeners. In some embodiments, the repair compound includes a bimodal distribution of hollow glass microspheres from two different strength/size curves.

18 Claims, 2 Drawing Sheets

(56) References Cited

U.S. PATENT DOCUMENTS

| | | | |
|---|---|---|---|
| 6,355,099 B1 | 3/2002 | Immordino et al. | |
| 6,531,528 B1 | 3/2003 | Kurp | |
| 6,673,144 B2 | 1/2004 | Immordino, Jr. et al. | |
| 6,988,343 B2 | 1/2006 | Gleeson et al. | |
| 7,790,796 B2 | 9/2010 | Foster | |
| 8,257,526 B2 | 9/2012 | Thompson et al. | |
| 8,329,785 B2 | 12/2012 | Langford | |
| 8,507,587 B2 | 8/2013 | Gozum | |
| 8,653,158 B2 | 2/2014 | Gozum | |
| 8,686,070 B2 | 4/2014 | Bakeev et al. | |
| 8,691,889 B2 | 4/2014 | Gozum | |
| 8,734,613 B1 | 5/2014 | Frank et al. | |
| 8,834,759 B2 | 9/2014 | Lalouch et al. | |
| 8,931,230 B2 | 1/2015 | Negri et al. | |
| 9,695,343 B2 | 7/2017 | Satrijo et al. | |
| 10,273,185 B2 * | 4/2019 | Gozum | C04B 26/026 |
| 2003/0119948 A1 | 6/2003 | Kelly | |
| 2004/0087683 A1 | 5/2004 | Foster et al. | |
| 2005/0112981 A1 | 5/2005 | Nanko | |
| 2006/0159908 A1 | 7/2006 | Houck | |
| 2012/0216944 A1 | 8/2012 | Langford | |
| 2013/0190430 A1 | 7/2013 | Gozum | |
| 2013/0296462 A1 | 11/2013 | Gozum | |

FOREIGN PATENT DOCUMENTS

| | | |
|---|---|---|
| WO | WO 2003-040243 | 5/2003 |
| WO | WO 2006-132385 | 12/2006 |
| WO | WO 2015-195429 | 12/2015 |

OTHER PUBLICATIONS

International Search Report for PCT International Application No. PCT/US15/35055 dated Sep. 2, 2015, 3 pages.

Finite Fiber, Nylon Product Data Sheet, retrieved from the internet at <https://www.finitefiber.com/images/pdf/Nylon-data-sheet.pdf> on Aug. 3, 2018, 1 page.

Finite Fiber, Polyester Product Data Sheet, retrieved from the internet at <https://www.finitefiber.com/images/pdf/Polyester-data-sheet.pdf> on Aug. 3, 2018, 1 page.

MiniFIBERS Inc., Carbon Fibers Technical Data Sheet, retrieved from the internet at <http://www.minifibers.com/documents/Td/TD_Carbon-Fibers.pdf> on Aug. 3, 2018, 1 page.

* cited by examiner

REPAIR COMPOUND AND METHODS OF USE

TECHNICAL FIELD

The present disclosure relates generally to materials such as paste or putties, often referred to as repair or spackling compounds, which are used to fill and repair holes, cracks and other minor surface defects or imperfections in wood, drywall, and/or plaster. In some specific embodiments, it relates to repair compounds especially suitable for repairing larger holes in vertical wall surfaces, as well as other wall surface imperfections.

BACKGROUND

Interior walls of homes and buildings are often constructed using gypsum wallboard panels (sometimes referred to as drywall). When cavities, recesses, holes, etc., are present (due to imperfections or damage), it is common to use a repair compound, and in particular a spackling compound, to fill such cavities. Conventional spackling compounds often include one or more inorganic fillers, one or more polymeric resin binders, and various thickeners and other additives. Lightweight spackling compounds have been developed that often contain, among other inorganic fillers, relatively low density fillers such as glass bubbles, hollow silica, or expanded perlite. After the spackling compound is applied to a wall, the water evaporates over a period of time resulting in the formation of a dried, hardened material that can be sanded, painted, etc.

Another, similar type of repair compound is known as a joint compound typically used to conceal the joint between adjacent wallboards. While spackling compounds and joint compounds do many of the same things and are both smeared onto walls to hide flaws, spackling compounds are generally lighter, dry more quickly, sand more easily, and are more expensive than joint compounds. For simplicity, the term "repair compound" as used throughout the present disclosure is inclusive of spackling compounds and joint compounds.

Spackling compounds are known in the art. U.S. Pat. No. 6,531,528 (Kurp), for example, discloses a ready-to-use patch repair product that includes a color change indicator. After the product has dried, the color changes to signal that, if desired, the user can perform other operations such as painting, sanding, etc., on the surface. U.S. Pat. No. 7,790,796 (Foster et al.) discloses a spackling compound that it easy to apply smoothly, can be applied in thicker layers than known spackling compounds without cracking upon drying, and can be modified after drying without pitting, flaking, or crumbling, particularly at the edges of the applied spackling patch. U.S. Patent Publication No. 2013/019043 (Gozum et al.) discloses a self-priming spackling compound.

SUMMARY

The inventors of the present disclosure recognized that while conventional spackling and other repair compounds are adequate for repairing relatively small imperfections or holes, the unique constraints presented by larger holes (e.g., holes having a major dimension of at least 2 inches) are not readily met. To repair or patch a large hole in a wall surface, a relatively large volume of the spackling compound is necessary. Conventional spackling compounds are susceptible to cracking, shrinkage, etc., when applied in larger quantities and allowed to dry. Further, most wall repair projects are performed on a vertical wall. The elevated density or weight of an applied, large volume of spackling compound tends to flow out of the hole due to gravity. In light of the above, the inventors of the present disclosure recognized a need for a repair compound suitable for large hole wall repair as well as other uses such as, for example, wood repair.

Some aspects of the present disclosure are directed toward a repair compound particularly well-suited for large hole repair but excellent in any repair use. In some embodiments, the compound is especially useful for vertical wall repair. The repair compound includes a latex resin, a thickener, fibers, and a filler material. The repair compound is configured to exhibit pseudoplastic-type behavior, and has a density of not greater than 4.0 lbs/gal. In some embodiments, repair compounds of the present disclosure include one or more of (1) hydrophobic and hydrophilic fibers of different morphologies, (2) HASE-type thickeners, (3) a bimodal distribution of hollow glass microspheres from two different strength/size curves, and (4) organometallic adhesion promoters. Other aspects of the present disclosure are directed toward a method of repairing a hole in a substrate. The method includes receiving a volume of the repair compound described above. A quantity of the repair compound is applied into the hole. In some embodiments, the repair compound is dough-like, and the step of applying a quantity of the repair compound includes rolling and shaping the obtained quantity of the repair compound in the user's hand(s), followed by pressing the shaped repair compound into the hole. In other embodiments, the repair compound is provided as part of a kit. In some embodiments, the kit includes a tool.

DETAILED DESCRIPTION

Figure 1:
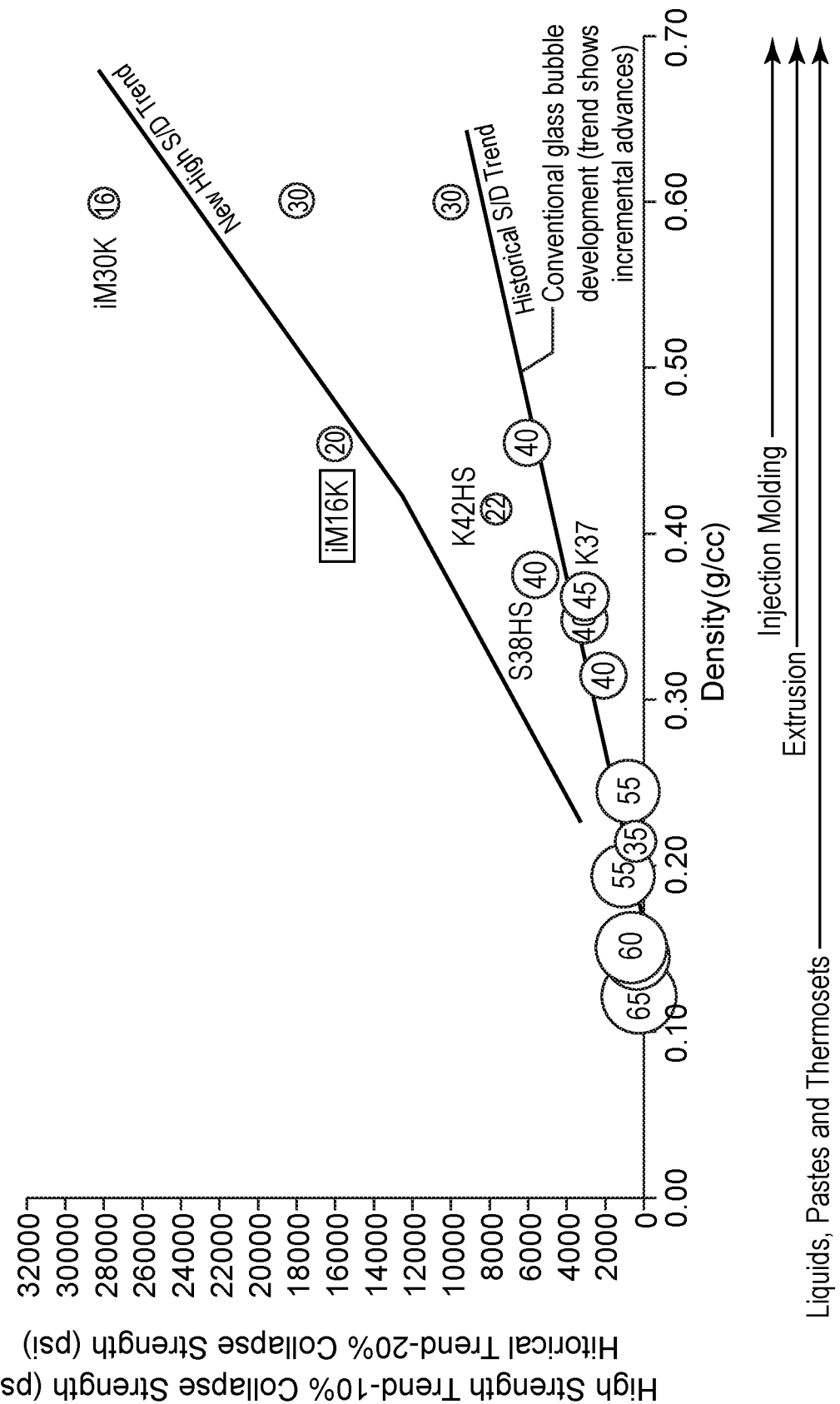
FIG. 1 is a graph illustrating strength, density, and size characteristics for various glass bubbles, including glass bubbles useful with repair compounds of the present disclosure.

Various embodiments and implementations will be described in detail. These embodiments should not be construed as limiting the scope of the present disclosure in any manner, and changes and modifications may be made without departing from the spirit and scope of the inventions. For example, many of the embodiments, implementations, and examples are discussed with specific reference to wall repair, but these should not be construed to limit the application scope to this one exemplary implementation. Further, only some end uses have been discussed herein, but end uses not specifically described herein are included within the scope of the present disclosure. As such, the scope of the present disclosure should be determined by the claims.

Repair compounds of the present disclosure are suitable for filling and repairing relatively large holes or cavities (e.g., major dimension of at least 2 inches), cracks or other imperfections in a surface (such as, for example, a gypsum wallboard surface), as well as virtually any other, smaller wall surface imperfection. The repair compounds of the present disclosure exhibit a pseudoplastic-type behavior and are lightweight (e.g., having a density of not more than 4.0 lbs/gal, alternatively not more than 3.5 lbs/gal, alternatively not more than 3.0 lbs/gal).

Repair compounds of the present disclosure generally include a latex resin, a thickener, fibers, and a filler material. Other optional ingredients may be included in various other embodiments. In some embodiments, the thickener in combination with the fibers produces a repair compound exhibiting pseudoplastic-type behavior. In some embodiments, the filler material has a bimodal distribution of glass bubbles, which results in a lightweight repair compound. In some embodiments, the repair compound is a wall repair compound. In some embodiments, the repair compound is a wood repair compound.

Resin

The repair compounds of the present disclosure comprise at least one latex resin or resin binder, such as a polymeric resin binder conventionally viewed as being useful with repair compounds. Such binders are often supplied as an aqueous latex emulsion (for example, comprising between 15-60 percent solids of polymeric resin binder, in water). Exemplary polymeric resins potentially suitable for binders of the present disclosure include, for example, the well-known vinyl acrylic polymers and copolymers, acrylic polymers and copolymers, polyvinyl acetate polymers and copolymers, ethylene vinyl acetate polymers and copolymers, styrene-butadiene polymers and copolymers, polyacrylamide polymers and copolymers, natural rubber latex, natural and synthetic starch, casein, and the like. Such binders can be used alone or in combination with one another. In some embodiments, the resin or resin binder is 100% acrylate. In some embodiments, the resin or resin binder portion of the repair compound includes at least one latex resin and at least one non-latex resin. In some embodiments, the latex and non-latex resin form a uniform blend.

In some embodiments, the latex resin is an acrylic latex emulsion binder. For example, the resin can be a vinyl acrylic latex emulsion binder available from Arkema Coating Resins of Cary, N.C., under the trade designation ENCOR 379G. The ENCOR 379G latex is a high molecular weight polymer that delivers very high scrub resistance and durability in both interior and exterior architectural coatings. This polymer combines high molecular weight with an optimized glass transition temperature to produce flexible films with excellent grain crack resistance and long term durability. Further, vinyl acrylic latex emulsions, such as the ENCOR 379G, can exhibit sufficient tolerance to loading of the optional filler material described below.

In some embodiments, the acrylic latex emulsion binder (e.g., ENCOR 379G) is combined with another latex binder (e.g., DOW ENCOR 627 or 626 or 631 or NEOCAR Latex 2300 or NEOCAR Latex 2535).

The latex emulsion resin can comprise at least about 20, 30, 40, or 50 percent, by weight, of the repair compound in some embodiments.

Thickener

The repair compounds of the present disclosure also include or comprise a thickener (also referred to as lubricants, gelling agents, bodying agents, water retention agents, etc.).

In some embodiments, the thickener is a hydrophilic alkali swellable emulsion (HASE) thickener. HASE has surprisingly been found to exhibit appropriate thickening properties to serve as the basis for a pseudoplastic system. In some embodiments, the thickener is a HASE thickener available from Coatex, Inc. under the trade designation THIXOL 53L.

Alternatively, other thickeners conventionally employed with repair compounds may be used, for example to provide an increased viscosity of the repair compounds such that the compound does not excessively sag, slump or run (e.g., when applied to a vertical wall). The thickener may be, for example, an organic polymeric thickener designed to exhibit its thickening effect by its interaction with the water that is present in the repair compound. Commonly used organic polymeric thickeners are often water soluble or water swellable (e.g., at around 25° C.). Such organic polymeric thickeners can be synthetic, can be natural products, and/or can be obtained or derived from natural products. Such thickeners can include for example, polyethylene glycol, polyethylene oxide (and/or polyethylene oxide/polypropylene oxide copolymers), polyvinyl alcohol, polymers or copolymers of ethylenically unsaturated carboxylic acids and their derivatives, such as acrylic acid and acrylamide, guar gum, xanthan gum, alginates, tragacanth gum, pectin, amylopectin, dextran, polydextrose, and the like. Optional thickeners may also include, for example, polysaccharides and derivatives thereof, for example, the well-known cellulose ethers (e.g., methyl cellulose, hydroxypropyl cellulose, hydroxypropyl methyl cellulose, hydroxyethyl cellulose, hydroxyethyl methyl cellulose, hydroxyethyl hydroxypropyl cellulose, ethylhydroxyethyl cellulose, and sodium carboxymethyl cellulose).

While various ones of thickeners described above may be used with the repair compounds of the present disclosure, it has been surprisingly found that clay-type thickeners are too dense for use in the repair compounds described herein. Further, it has surprisingly been found that cellulosic thickeners may impart excessive lubricity to the repair compound (as formulated with the other components or ingredients of the present disclosure) and make it hard for the repair compounds described herein to stick in the hole.

In some embodiments, the thickener comprises about 1 percent by weight or less of the repair compound formulation.

Fibers

The repair compounds of the present disclosure further include fibers. In some embodiments, the repair compounds include two (or more) different types of fibers. In some embodiments, the fibers are selected in conjunction with the selected thickener to impart pseudoplastic-type behavior into the repair compound, as well as to enhance performance of the repair compound in repairing a wall surface.

The fibers can assume a variety of forms, and in some embodiments include a first fiber type selected to provide one or more desired performance attributes, and a second fiber type that is also selected to provide desired performance attributes, but that differ from that or those of the first fiber type. For example, the first fiber type can be selected to provide one or more of general reinforcement, crack resistance, reduced shrinkage, viscosity control, particle suspension, shear thinning, improved dimensional stability without absorbing other ingredients or reducing shelf life, etc. The second fiber type can be selected to provide porosity control and absorbency (as well as reinforcement).

With the above explanations in mind, in some embodiments, the first fiber type is a hydrophobic fiber and the second fiber type is a hydrophilic fiber. In related embodiments, a nominal length of the first fiber type is less than the nominal length of the second fiber type, for example on the order of 10× less.

In some embodiments, the fibers of the present disclosure include a mixture of hydrophobic dry fibrillated polyethylene fibers and hydrophilic rayon fibers. The dry fibrillated polyethylene fibers can have a nominal size that is less than a nominal size of the hydrophilic rayon fibers. For example, the hydrophobic dry fibrillated polyethylene fiber can have nominal dimension on the order of 15 microns in diameter and 0.55-0.80 mm in length, whereas the hydrophilic rayon fibers can have nominal dimensions on the order of 4.5 denier by 0.5 inch. The dry fibrillated polyethylene fibers as combined with the thickener provide one or more of general reinforcement, crack resistance, reduced shrinkage, viscosity control, particle suspension, shear thinning, and improved dimensional stability without absorbing other ingredients or reducing shelf life. The hydrophilic rayon fibers as combined with the thickener provide one or more of porosity control and absorbency, and reinforcement.

In some embodiments, the two different fiber types augment desired performance attributes of the thickeners described above, allowing for the use of a lesser amount of the thickener (as compared to conventional spackling compound formulations). The hydrophilic rayon fiber (for example) can serve to distribute stress over a larger area in the repair compound upon drying. Regardless, in some embodiments, the thickener and fibers combine to render the repair compound to exhibit a pseudoplastic-type behavior as described below.

In some embodiments, the repair compound of the present disclosure may include less than about 1 percent by weight of the hydrophobic dry fibrillated polyethylene fibers (or equivalent fibers), and further include less than about 1 percent by weight of the hydrophilic rayon fibers (or equivalent fibers). In related embodiments, the repair compound of the present disclosure may include a greater amount (by weight) of the hydrophilic rayon fiber (or equivalent fibers) than the hydrophobic dry fibrillated polyethylene fibers (or equivalent fibers).

Filler

The repair compounds of the present disclosure further include a filler. In some embodiments, the filler is an inorganic filler system that comprises one or more inorganic fillers. In some embodiments, the inorganic filler system includes synthetic inorganic fillers. The term "synthetic inorganic filler" as used herein includes any filler that has been transformed, regenerated, recrystallized, reconstituted, etc., from an original state which may be its naturally occurring, mined state into its current state by a chemical synthesis process (e.g., precipitated from solution, generated by flame hydrolysis, etc.) or by a physical synthesis process (e.g., precipitated from a gaseous phase, solidified by way of a sol-gel process, etc.). The term "synthetic inorganic filler" as used herein also includes any filler that has been substantially transformed from an original state (which may be its naturally occurring, mined state) into its current state by a physical synthesis process of being brought into an at least partially softened or molten state and then solidified by cooling, such that any substantially crystalline structure that may have existed in the natural state is substantially erased such that the material is now in a substantially amorphous form (e.g., comprising less than about 0.5 percent crystallinity by weight). Such processes may include, for example, melt processing, flame-fusion and the like.

Using the definitions provided above, synthetic inorganic fillers include, for example, so-called glass bubbles or microspheres (such as those available from 3M Company of St. Paul, Minn., under the trade designation 3M Glass Bubbles), ceramic microspheres (such as those available from 3M Company under the trade designation 3M Ceramic Microspheres), synthetic clays (e.g., synthetic silicate clays such as those available under the trade designation Laponite from Southern Clay Products of Gonzales, Tex.), precipitated silica, fumed silica, vitreous silica, synthetic titanium dioxide (as made, for example, by the sulfate process or the chloride process), synthetic (precipitated) calcium carbonate (as made, for example, by passing carbon dioxide through a solution of calcium hydroxide), and the like. In this context, the term "synthetic inorganic fillers" includes such synthetic inorganic fillers as have been modified to include organic surface groups, coatings, etc.

In certain embodiments, the synthetic inorganic fillers used herein comprise a bimodal particle size mixture of larger synthetic inorganic filler particles and smaller synthetic inorganic filler particles. In various embodiments, the synthetic inorganic filler used herein comprises a bimodal particle size mixture of synthetic inorganic filler particles comprising a particle size ratio of larger size filler to smaller size filler (as obtained by ratioing the medium particle size of the two filler populations) of at least about 5:1.

In some embodiments, such synthetic inorganic fillers are comprised of substantially spherical particles. In this context, the term "substantially spherical" denotes that a substantial majority of the particles are spherical except for such occasional deviations, deformities, etc., as are known to those of skill in the art to be occasionally encountered in the manufacturing processes used to produce the particles (for example, somewhat misshapen particles may occasionally be produced, two or more particles may agglomerate or adhere to each other, and so on).

Suitable substantially spherical synthetic inorganic fillers as defined herein include so-called glass bubble and ceramic microspheres. Such glass bubbles can be synthesized, for example, by a process as described in U.S. Pat. Nos. 3,365,315 and 4,391,646, incorporated herein in their entirety. Such ceramic microspheres can be synthesized, for example, by sol-gel processes, as described for example in U.S. Pat. Nos. 3,709,706 and 4,166,147, incorporated herein in their entirety. Other methods potentially useful for making ceramic particles and/or microspheres are described in, for example, U.S. Pat. No. 6,027,799, incorporated herein in its entirety.

In some embodiments, the synthetic inorganic filler used herein comprises a bimodal particle size mixture of larger substantially spherical synthetic inorganic filler particles and smaller substantially spherical synthetic inorganic filler particles. In related embodiments, the synthetic inorganic filler used herein comprises a bimodal distribution or mixture of first and second substantially spherical synthetic inorganic filler particles, with a density and/or strength of each of the first substantially spherical synthetic inorganic filler particles being greater than a density of each of the second substantially spherical synthetic inorganic filler particles. In further related embodiments, the synthetic inorganic filler comprises a bimodal distribution of hollow glass microspheres from two different strength/size curves. For example, the first substantially spherical synthetic inorganic filler particles are glass bubbles or microspheres having a mean particle size on the order of 50-55 microns and a density on the order of 0.2 g/cc, and the second substantially spherical synthetic inorganic filler particles have a mean particle size on the order of 20 microns and a density on the order of 0.45 g/cc. For example, the first substantially spherical synthetic inorganic filler particle can be Glass Bubbles available from 3M Company of St. Paul, MN under the trade designation K20, and the second substantially spherical synthetic inorganic filler particles can be Glass Bubbles available from 3M Company of St. Paul, Minn. under the trade designation iM16K.

As highlighted in strength/size curves of FIG. 1, the K20 glass bubble and the iM16K glass bubble exhibit different size and strength properties. When collectively employed as part of a repair compound, it has surprisingly been found that the synthetic inorganic filler (as a bimodal distribution) provides sufficient strength for the resultant repair compound while reducing the repair compound's density (as compared to conventional spackling compounds). In some embodiments, the synthetic inorganic filler comprises a bimodal mixture of larger, less dense glass bubbles (e.g., K20 Glass Bubbles) at about 20-30 percent by weight, and about 2-10 percent by weight of the second, smaller/harder glass bubble (e.g., iM16K Glass Bubbles).

Optional Ingredients

Repair compounds of the present disclosure may optionally include one or more additional components for various purposes.

For example, an adhesion promoter can be employed to provide secure attachment of the repair compound to a wall surface. The adhesion promoter can assume a variety of forms as known to those of skill, and can include a titanium alkoxide adhesion promoter, such as an adhesion promoter available from Chartwell International, Inc. under the trade designation B-515.71W. In some embodiments, the repair compounds may include less than about 1 percent by weight of an adhesion promoter.

In some embodiments, the repair compounds of the present disclosure can include an activator or pH control agent to activate one or more of the thickeners described above (e.g., an HASE thickener may not activate or thicken the mixture at a pH less than 8.5). For example, and as described in greater detail below, in some embodiments, formulation of the repair compound can include adjustment of the pH to about 9 to allow for activation of the thickener. Where provided, the activator or pH control agent can assume a variety of forms known in the art and appropriate for use with a repair compound, and for example can be an amino alcohol such as available from Dow Chemical Company under the trade designation AMP-95. Where provided, the repair compound can include less than about 0.15 percent by weight of the activator or pH control agent.

In some embodiments, the repair compounds of the present disclosure may include one or more smoothing agents, such as one or more organic ether smoothing agents, found to advantageously affect the consistency of the compound. In some embodiments, the optional smoothing agent, such as an organic ether smoothing agent, at the concentrations disclosed herein can impart a smooth consistency to the repair compound (absent the smoothing agent, the repair compound may take on a more crumbly appearance) such that the repair compound is more easily spreadable it does not run, sag, slump or crumble, once applied, e.g., to a vertical wall. In contrast to the above-described thickeners, such optional smoothing agents appear to function to reduce the apparent viscosity of the repair compound rather than to increase it (while, again, not causing unacceptable sagging or slumping). Some examples of acceptable smoothing agents useful with the repair compounds of the present disclosure are described in U.S. Pat. No. 8,507,587, the teachings of which are incorporated herein in their entirety.

In various embodiments, the repair compounds described herein may include one or more organic ether smoothing agents. In some embodiments, the organic ether smoothing agent(s) is/are present in total in an amount of at most about 2.5 percent, at most about 1.5 percent, or at most about 0.5 percent, by weight of the total repair compound as formulated. In various additional embodiments, the one or more organic ether smoothing agents are present in total in an amount of at least about 0.025 percent, at least about 0.05 percent, or at least about 0.15 percent, by weight.

Suitable organic ether smoothing agents may be chosen, for example, from those products available from Dow Chemical under the trade designations DOW P-Series Glycol Ethers and DOW E-Series Glycol Ethers (including, for example, various products available under the trade designations DOWANOL, CARBITOL, and CELLOSOLVE), and mixtures thereof. In some embodiments, organic ether smoothing agents are chosen from organic ethers that comprise exactly one hydroxyl group and exactly one ether group. This group includes, for example, propylene glycol butyl ether (available from Dow Chemical under the trade designation DOWANOL PnB), propylene glycol methyl ether (available from Dow Chemical under the trade designation DOWANOL PM), as well as other products available from Dow Chemical under the DOWANOL, CARBITOL, and CELLOSOLVE trade designations, and mixtures thereof. In other embodiments, optional smoothing agents are chosen from organic ethers that comprise exactly one hydroxyl group and exactly two ether groups. In yet other embodiments, optional smoothing agents are chosen from organic ethers that comprise exactly one hydroxyl group and exactly three ether groups. In yet other embodiments, optional smoothing agents are chosen from organic ethers that comprise at least one ether group and that do not contain any hydroxyl groups.

In addition to the components discussed above, other components may be added to the repair compound. These may include, for example, water, which may be added at the end of the production process, for final adjustment of e.g., viscosity. Thus, in certain embodiments, water (in addition to the water optionally present in the aqueous acrylic latex binder emulsion) may be added to the formulation.

Other additives that may be present include preservatives that may have advantageous effects on the repair compound during storage, and may also serve to minimize the degree to which mold or fungus may grow on the dried repair compound. Thus, in certain embodiments, the repair compounds disclosed herein can optionally comprise at least about 0.1, 0.2 or 0.3 percent by weight of a preservative or preservatives. In further embodiments, the repair compounds disclosed herein optionally comprise at most about 0.8, 0.6 or 0.4 percent by weight of a preservative or preservatives. Suitable preservatives include, for example, those available under the designation Mergal 192 and Polyphase P20T, from Troy Corporation of Florham Park, N.J.

To enhance the ability of the repair compound to "hide" or blend in with the visual appearance of the wall, the repair compound may also optionally include one or more colorants or primers. One suitable colorant or primer is, for example, titanium dioxide. While not wishing to be bound by theory, it is believed that titanium dioxide reflects light and thereby effectively hides differences in the substrate color/appearance when added to the repair compound formulation. Another exemplary suitable colorant is carbon black. Specific commercially available colorants suitable for use in the repair compound of the present disclosure include MONARCH 120 carbon black available from Cabot Corporation of Boston, Mass. and TI-PURE R700 titanium dioxide available from DuPont Chemicals of Wilmington, Del. In some embodiments, where provided, the amount of colorant is greater than 8% by weight. In some embodiments, the amount of colorant is less than about 20 percent by weight. In some embodiments, the amount of colorant is less than about 10 percent by weight. In some embodiments, the amount of colorant is less than 1 percent by weight, all percentages being of the total repair compound as formulated.

Pseudoplastic-Type Behavior

Figure 2:
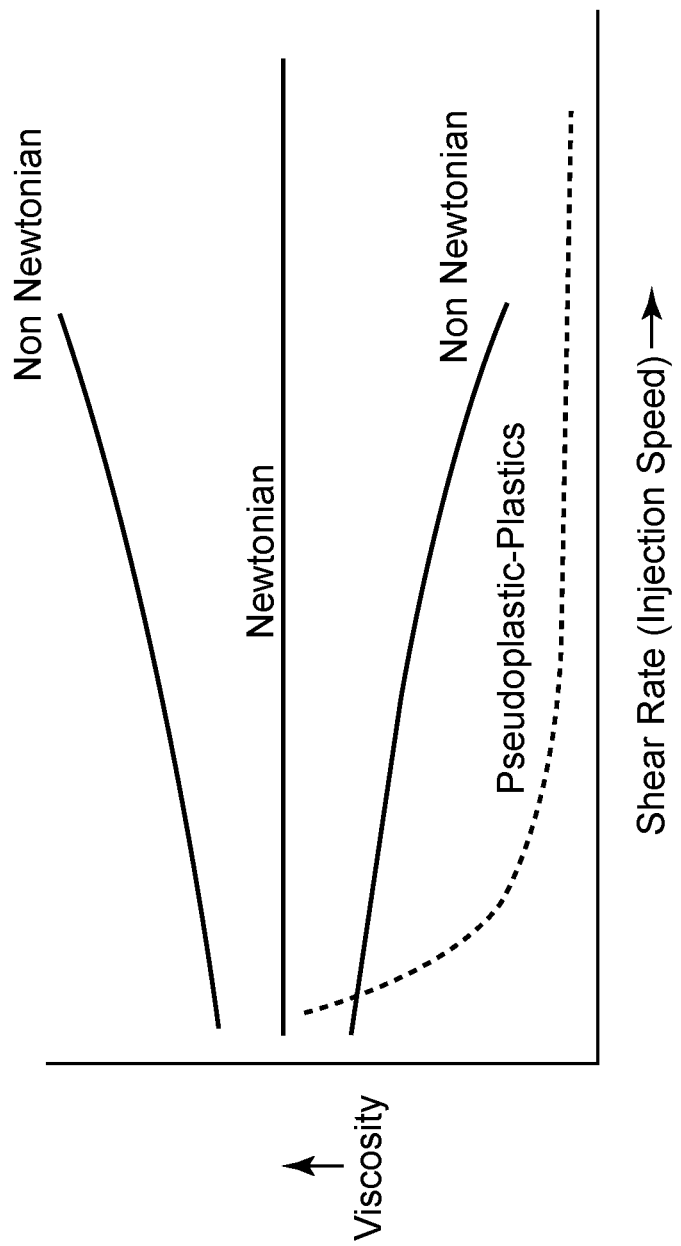
FIG. 2 is a graph illustrating viscosity and shear rate characteristics of various classes of materials, including pseudoplastic-type behavior of the repair compounds of the present disclosure.

Regardless of whether one or more of the optional components mentioned above are included, the repair compounds of the present disclosure are formulated to exhibit pseudoplastic-type behavior. As used herein, the term "psuedoplastic" refers to a material or composition that exhibits shear thinning without significant initial resistance to deformation. Like plastic materials, pseudoplastic materials also show linear (Newtonian) behavior at the highest levels of stress and shear rate. FIG. 2 is a graph illustrating viscosity vs. shear rate curves for various material types or classes, including non-Newtonian, Newtonian and pseudoplastic.

In some embodiments, the repair compounds of the present disclosure exhibit a viscosity vs. shear rate performance characteristics akin to the pseudoplastic curve of FIG. 2. The pseudoplastic-type behavior promotes easy spreading of the repair compound on to a surface (such as a surface "behind" a large wall hole being repaired), but once the user has stopped spreading, the repair compound quickly stops flowing. In some embodiments, the pseudoplastic-type behavior is achieved by using a HASE thickener in combination with hydrophobic dry fibrillated polyethylene fibers (or similar fiber material) and hydrophilic rayon fibers (or similar fiber material).

In some embodiments, this pseudoplastic rheology is achieved, or primarily dictated by, the thickener and fibers. That is to say, other components of the repair compound (e.g., resin, fillers, etc.) may or may not affect a pseudoplasticity of the resultant repair compound, but the effect(s), if any, does not dominate the pseudoplastic-type properties exhibited by the thickener in combination with the fibers.

The repair compounds of the present disclosure can be employed to repair a plethora of wall surface imperfections or defects (e.g., holes, cracks, etc.) and optionally a joint compound. Further, the repair compounds of the present disclosure are well-suited to be applied into a larger hole (e.g., hole with a major dimension of at least 2 inches) in a vertical wall surface (e.g., following placement of a backing material or panel onto a backside of the wall in a region of the hole).

In some embodiments, the repair compound of the present disclosure can be provided to an end user as part of a kit. Exemplary kits can further include one or more tools, optionally a backing device for establishing a scaffolding structure "behind" the hole for receiving the repair compound (e.g., non-limiting examples, of which are described in U.S. application Ser. No. 62/015,061 filed on Jun. 20, 2014, entitled "Wall Hole Repair Device, Kit, and Method", etc.

Methods of Use

The repair compounds of the present disclosure can be formulated and applied in a manner akin to conventional spackling compounds, including the user spreading a quantity of the repair compound into the hole and along the wall surface surrounding the hole with a spreading tool. In other embodiments, the repair compounds of the present disclosure can be provided to a user with a reduced water content (akin to a dough material). The corresponding methods of use of the present disclosure include the user rolling a volume of the dough-like repair compound to shape with the user's hand(s), and then inserting and pressing the shaped compound into the hole.

EXAMPLES

In order that aspects of the present disclosure can be more fully understood, the following examples are set forth. It should be understood that these examples are for illustrative purposes only, and are not to be construed as limiting the present disclosure in any manner.

A Glossary of Components used in the following Examples is provided below:

| Material Name | Chemical Name | Vendor |
|---|---|---|
| Encor Latex 379G, 627, 626, 631, | Vinyl Acrylic Latex Emulsion Resin; Or 100% Acrylic Latex Resin | Arkema Emulsion System Inc 410 Gregson Drive Cary, NC 27511 |
| K-20 Glass Bubbles | Glass Bubbles | 3M, Advanced Materials |
| iM16K Glass Bubbles | Glass Bubbles | |
| Rayon Fiber 4.5 d × 0.25" or 0.5" | Rayon Fibers | Minifibers, Inc 2923 Boones Creek Rd, Johnson City, TN 37615 |
| E380F Minifibers | Polyethylene Type E | |
| Polyphase P20T | ALIPHATIC ALCOHOL/GLYCOL ETHER/3-LODO-2-PROPYNYL BUTYL CARBAMATE | Troy Chemicals 8 Vreeland Rd, Florham Park, NJ 07932 |
| Mergal 186 Mergal 192 | 4,4-dimethyloxazolidine | Troy Chemicals 1 Ave L Newark, NJ 07105 |
| Propylene Glycol Butyl Ether | PROPYLENE GLYCOL N-BUTYL ETHER | Aldrich |
| Monarch 120 | POWDERED CARBON BLACK | Monarch |
| AMP-95 | 2-Amino-2-methyl-1-propanol | Angus Chemical Company 194 Pickett District Rd, New Milford, CT 06776-4415 |
| Coatex Thixol 53L | Acrylic Co-polymer | Coatex, Arkema Group |
| Chartwell B-515.71W | Adhesion Promoter | Chartwell International, Inc 100 John Dietsch Blvd, Attleboro Fall, MA 02763 |
| Rhodoline FT-100 | Poly(oxy-1,2-ethanediyl), .alpha. [tris(1-phenylethyl)phenyl]-.omega.-hydroxy- | Rhodia-Novecare 8 Cedar Brook Drive, Cranbury, NJ 08512-7500 |
| RHODOLINE 622 | SURFACTANT (ANTIFOAM) | "Fox, Laura" <laura.fox@solvay.com> |
| TRONOX CR-828 | TiO2 | Tronox LLC |

Example 1

A batch of repair compound was synthesized by the following general methods. The following equipment was provided: stainless steel containers, a high speed mixer including a Cowles blade (for high shear mixing), and a Hobart® mixer including a tool appropriate for low shear mixing.

The ENCOR 379G latex and the E380F minifibers were initially mixed for 15-20 minutes in the stainless steel mixing container with the Cowles blade (high shear). The temperature of the mix was maintained at less than 110° F. All remaining components other than the K20 Glass Bubbles were then added sequentially to the mixing container (using the Cowles blade), but run at a reduced speed to provide good mixing. The pH of the premix was adjusted to pH=9 with AMP-95. The mass or weight of each ingredient in the premix is provided in Table 1.

TABLE 1

Ingredients of Example 1 Premix

| Component | Mass (g) |
| --- | --- |
| ENCOR Latex 379G | 729 |
| E380F Minifibers | 4.5 |
| Polyphase P20T | 5.384 |
| Propylene Glycol Butyl Ether | 3.089 |
| Mergal 192 | 1.367 |
| B-515.71W Adhesion Promoter | 3.3 |
| iM15K Glass Bubbles | 54 |
| Carbon Black | 0.05 |
| Rayon Fibers | 7.5 |
| AMP-95 | 1.2 |
| Thixol 53L | 6 |

In the above, E380F SHORT STUFF fibers were hydrophobic dry fibrillated polyethylene fibers, 15 microns in diameter and 0.55-0.88 mm in length.

After the above solution was mixed uniformly, the premix was transferred to a bowl containing K20 Glass Bubbles (330 grams) and water (90 grams). All components were then slowly mixed using the Hobart mixer (the K20 Glass Bubbles are not strong enough to withstand high speed mixing). The resultant repair compound of Example 1 had the component formulation listed in Table 2.

TABLE 2

Example 1 Component Formulation

| Component | Weight Percent |
| --- | --- |
| ENCOR Latex 379G | 59.01 |
| K20 Glass Bubbles | 26.71 |
| iM16K Glass Bubbles | 4.371 |
| Rayon Fibers | 0.6071 |
| Polyphase P20T | 0.436 |
| Propylene Glycol Butyl Ether | 0.250 |
| Carbon Black | 0.0040 |
| Mergal 192 | 0.1106 |
| AMP-95 | 0.0971 |
| Thixol 53L | 0.729 |
| E380F Minifibers | 0.36 |
| B-515.71W Adhesion Promoter | 0.267 |
| Water | 7.285 |

The repair compound of Example 1 was found to be easily manually spread into relatively large holes in vertical drywall boards, exhibited insignificant or no flow upon removal of the spreading force or action, and exhibited insignificant or no sagging.

Example 2

The repair compound of Example 2 included the same ingredients as Example 1 (in the amounts specified below), except that Mergal 192 was replaced by Mergal 186, and Rhodoline® FT100 was added. All components except for the K20 Glass Bubbles and water were mixed in the stainless steel container using the Cowles blade at the component weight or mass listed in Table 3.

TABLE 3A

Components of Example 2 Premix

| Component | Weight (g) |
| --- | --- |
| ENCOR Latex 379G | 365.0 |
| E380F Minifibers | 2.27 |
| Polyphase P20T | 2.84 |
| Mergal 186 | 0.65 |
| Propylene Glycol Butyl Ether | 1.55 |
| B-515.71W Adhesion Promoter | 1.68 |
| iM15K Glass Bubbles | 27.9 |
| Carbon Black | 0.031 |
| Rayon Fibers | 3.05 |
| AMP-95 | 0.60 |
| FT100 | 5.55 |
| Thixol 53L | 3.6 |

After the above solution was uniformly mixed, the above premix was combined with K20 Glass Bubbles (175 grams) and water (35 grams), and slowly mixed into solution with the Hobart mixer.

TABLE 3B

Components of Example 2 Total w/w %

| Component | w/w % |
| --- | --- |
| Dow Encor Latex 379G | 55.83% |
| E380F Minifibers | 0.34% |
| Polyphase P20T | 0.41% |
| Mergal 186 | 0.10% |
| Propylene Glycol Butyl Ether | 0.24% |
| Chartwell B-515.71W | 0.25% |
| iM16K Glass Bubbles | 4.14% |
| Monarch 120 Carbon Black | 0.004% |
| Rayon Fiber 4.5 d × 0.5" | 0.50% |
| AMP-95 to pH = 9 | 0.092% |
| Rhodia FT-100 | 0.873% |
| Coatex Thixol 53L | 0.459% |
| K-20 glass Bubbles | 26.8% |
| water | 9.96% |

The repair compound of Example 2 resulted once the ingredients were uniformly mixed. The density of the repair compound was tested with "US Standard Weight Per Gallon Cup" density cup from Paul N. Gardner Co., Inc. (GARDCO) of Pompano Beach, Fla., and was found to be 3.3 lbs/gal.

The repair compound of Example 2 was further tested by applying the repair compound to repair a hole in a drywall board as described below. Drywall boards of 12 inches×12 inches were obtained, and a hole was formed through a thickness of each drywall board (hole size of 3-4 inches in width). The drywall boards were vertically mounted on to a wood stud (1.5 inches×3.5 inches) building frame, with a grid of 12 inches×12 inches. A backing support panel was assembled to a rear side of each drywall board in a region of the corresponding hole. The repair compound of Example 2 was then manually applied to fill the hole of each drywall board. After 72 hours, on each drywall board, the hardened excess repair compound (or spackle) was sanded down using a sand sponge (coarse-fine grade obtained from 3M Company), and the surface of the spackle was smoothed to the drywall board surface. The drywall boards were then primed and painted in half surface per standard painting procedure. Approximately 24 hours after painting, nails or anchors with different sizes where nailed to the spackle area of each drywall board. Metal objects with certain weights were hung on the anchors. After a dwell time of approximately 2-3 weeks, the degree of sagging of each of the anchors was visually assessed.

In a first strength assessment employing the protocol described above, two pieces of 1-lb metal were hung on to a smooth finished nail for two weeks. At the end of the second week, there was no noticeable sagging of the nails.

In a second strength test assessment employing the protocol described above, three pieces of 1-lb meal were hung on to a #4-6×⅞ inch Ribbed Plastic Anchor for three weeks. At the end of the third week, there was no noticeable sagging of the anchors.

Examples 3-8

Repair compound premixes of each of Examples 3-8 were made using the general method described in Example 1 except that the components listed below in Table 4 were used. The components listed in Table 4 below are the components of the premix (not including glass bubbles).

TABLE 4

Components of Examples 3-8 Premix.

| | Example 3 | Example 4 | Example 5 | Example 6 | Example 7 | Example 8 |
|---|---|---|---|---|---|---|
| Dow Encor Latex 379G | 44.4% | 26.6% | | | 26.6% | 26.6% |
| Dow Encor Latex 627 | 44.4% | 62.2% | | | 62.2% | 62.2% |
| Dow Encor Latex 631 | | | 88.8% | | | |
| Dow Encor Latex 626 | | | | 88.8% | | |
| Polyphase P20T | 0.64% | 0.64% | 0.64% | 0.64% | 0.64% | 0.64% |
| Mergal 186 | 0.17% | 0.17% | 0.17% | 0.17% | 0.17% | 0.17% |
| Propylene Glycol Butyl Ether | 0.40% | 0.40% | 0.40% | 0.40% | 0.40% | 0.40% |
| Rhodia FT-100 | 1.60% | 1.60% | 1.60% | 1.60% | 1.60% | 1.60% |
| AMP-95 | 0.16% | 0.16% | 0.16% | 0.16% | 0.16% | 0.16% |
| RHODOLINE 622 | 0.080% | 0.080% | 0.080% | 0.080% | 0.080% | 0.080% |
| Chartwell B-515.71W | 0.40% | 0.40% | 0.40% | 0.40% | 0.40% | 0.40% |
| Water | 5.27% | 5.27% | 5.27% | 5.27% | 5.27% | 5.27% |
| E380F Minifibers | 1.04% | 1.04% | 1.04% | 1.04% | 1.04% | 1.04% |
| Rayon Fiber 4.5 d × 0.25" | 0.72% | 0.72% | 0.72% | 0.72% | | |
| PP (7 d × 0.25") | | | | | 0.72% | |
| Acrylic fiber (0.25") | | | | | | 0.72% |
| Coatex Thixol 53L | 0.72% | 0.72% | 0.72% | 0.72% | 0.72% | 0.72% |

The ability of the repair compound premixes of Examples 3-8 to withstand freeze-thaw testing was evaluated. Freeze-thaw testing involves the following protocol: Samples were placed in a 0° F. freezer for approximately 24 hours. The samples were then placed at room temperature for approximately 24 hours. This freeze-thaw process is repeated for a total of 5 (five) cycles. After each freeze-thaw cycle, the repair compound premix was visually evaluated to detect whether the repair compound exhibited any (1) formation of solid chunks/lack of cohesion; (2) phase separation after thawing to room temperature conditions. If either formation of solid chunks or phase separation was evident, the repair compound premix sample was removed from additional freeze-thaw testing and was noted as failing the testing after that cycle. Results of the freeze-thaw testing performed on the repair compound of Examples 3-8 is provided in Table 5 below.

TABLE 5

Results of Freeze-Thaw Testing of the Repair compound Premix of Examples 3-8.

| | Example 3 | Example 4 | Example 5 | Example 6 | Example 7 | Example 8 |
|---|---|---|---|---|---|---|
| F/T cycle 1 | Pass | pass | fail, form thick chunks | pass | pass | pass |
| F/T cycle 2 | Pass | pass | | pass | pass | pass |
| F/T cycle 3 | Pass | pass | | pass | pass | pass |
| F/T cycle 4 | Pass | pass | | pass | pass | pass |
| F/T cycle 5 | Pass | pass | | pass | pass | pass |

Examples 9-14

Repair compounds of each of Examples 9-14 were made using the general method described in Example 1 except that the components listed below in Table 6 were used. The components listed in Table 6 below include the components of the premix (before glass bubbles were added) as well as the amount of glass bubbles added after formation of the premix.

TABLE 6

Components of the Wall-Repair Compound of Examples 9-14

| COMPONENT | Example 9 | Example 10 | Example 11 | Example 12 | Example 13 | Example 14 |
|---|---|---|---|---|---|---|
| Dow Encor Latex 379G | 55.8% | | 18.0% | | | |
| Dow Encor Latex 627 | | | 7.5% | 3.06% | | |
| Dow Encor Latex 626 | | 55.5% | 33.8% | 57.9% | 55.5% | 55.5% |
| Polyphase P20T | 0.41% | 0.40% | 0.40% | 0.40% | 0.38% | 0.38% |
| Mergal 186 | 0.10% | 0.10% | 0.10% | 0.10% | 0.10% | 0.07% |
| Propylene Glycol Butyl Ether | 0.24% | 0.25% | 0.25% | 0.25% | 0.25% | 0.25% |
| Rhodia FT-100 | 0.87% | 1.00% | 1.00% | 1.00% | 1.01% | 1.01% |
| AMP-95 | 0.09% | 0.10% | 0.10% | 0.10% | 0.10% | 0.10% |
| RHODOLINE 622 | 0.01% | 0.05% | 0.01% | 0.01% | 0.01% | 0.01% |
| Chartwell B-515.71W | 0.25% | 0.25% | 0.31% | 0.31% | 0.25% | 0.25% |
| Water | 10.0% | 8.9% | 6.29% | 4.05% | 8.84% | 8.85% |
| Monarch 120 Carbon Black | 0.004% | | | 0.00% | | |
| E380F Minifibers | 0.34% | 0.65% | 0.40% | 0.35% | 0.65% | 0.65% |
| Rayon Fiber 4.5 d × 0.25" | | 0.45% | | 0.66% | | |
| Rayon Fiber 4.5 d × 0.5" | 0.50% | | 0.66% | 0.66% | 0.45% | |
| Acrylic fiber (1.5 d × 0.25") | | | | | | 0.45% |
| Coatex Thixol 53L | 0.46% | 0.45% | 0.45% | 0.45% | 0.45% | 0.45% |
| iM16K Glass Bubbles | 4.14% | 4.50% | 8.00% | 8.00% | 4.57% | 4.60% |
| K-20 glass Bubbles | 26.80% | 27.40% | 22.70% | 22.70% | 27.4% | 27.40% |

The ability of the repair compounds of Examples 9-14 to withstand freeze-thaw testing was evaluated using the freeze-thaw protocol described above. Results of the freeze-thaw testing performed on the repair compound of Examples 9-14 is provided in Table 7 below.

TABLE 7

Results of Freeze-Thaw Testing of the Repair compound of Examples 9-14.

| Test | Example 9 | Example 10 | Example 11 | Example 12 | Example 13 | Example 14 |
|---|---|---|---|---|---|---|
| F/T cycle 1 | Fail, Form a solid rock | pass | pass | Pass | Pass | pass |
| F/T cycle 2 | | pass | pass | Pass | pass | pass |
| F/T cycle 3 | | pass | pass | Pass | pass | pass |
| F/T cycle 4 | | pass | pass | Pass | pass | pass |
| F/T cycle 5 | | pass | pass | Pass | pass | pass |

The density, solid percentage, and hardness of the repair compound of each of Examples 9-14 was evaluated.

The testing protocol to measure solid percentage was as follows: (1) set an oven at 250F, (2) place a pre-weighed repair compound sample in the oven; (3) turn off the oven; (4) let the sample dry overnight for approximately 18 hours; and (5) weigh the dried sample. This testing protocol permitted calculation of the solid percentage.

The testing protocol to measure surface hardness involved using a user's knuckle to physically press on the dried surface as hard as possible and thereby assessing the surface hardness in comparison with the surface hardness of the repair compound of Example 2.

The results of the density, solid percentage, and hardness of the repair compound are provided in Table 8 below.

TABLE 8

Density, Solid Percentage, and Surface Hardness of the Repair compound of Examples 9-14.

| Test | Example 9 | Example 10 | Example 11 | Example 12 | Example 13 | Example 14 |
|---|---|---|---|---|---|---|
| Density: lb/gallon | 2.82-2.89 | 3.43 | 3.52 | 3.21 | 3.09-3.13 | 2.72-2.83 |
| Solid % | 63.7% | 61.2% | 63.0% | 63.4% | 60.6% | 62.7% |
| Dried Surface Hardness comparison with Example 2 | Example 2 | Much harder | Slight softer | Slight Harder | same as Example 10 | same as Example 10 |

Examples 15 and 16

Repair compounds of each of Examples 15 and 16 were made using the general method described in Example 1 except that the components listed below in Table 9 were used. The components listed in Table 9 below include the components of the premix (before glass bubbles were added) as well as the amount of glass bubbles added after formation of the premix.

TABLE 9

Components of the Wall-Repair Compound of Examples 14 and 15

| Component | Example 15 | Example 16 |
|---|---|---|
| Dow Encor Latex 626 | 53.2% | 45.7% |
| Polyphase P20T | 0.36% | 0.307% |
| Mergal 186 | 0.09% | 0.077% |
| Propylene Glycol Butyl Ether | 0.25% | 0.215% |
| Rhodia FT-100 | 1.00% | 0.859% |
| AMP-95 | 0.10% | 0.084% |
| RHODOLINE 622 | 0.01% | 0.008% |
| Chartwell B-515.71W | 0.25% | 0.215% |
| Water | 12.62% | 15.2% |
| Monarch 120 Carbon Black | 0.006% | 0.005% |
| E380F Minifibers | 0.65% | 0.560% |
| Rayon Fiber 4.5 d × 0.25" | 0.45% | 0.384% |
| Coatex Thixol 53L | 0.43% | 0.368% |
| TRONOX CR-828 | | 9.50% |
| iM16K Glass Bubbles | 4.4% | 4.40% |
| K-20 glass Bubbles | 26.2% | 22.1% |

The density, solid percentage, and hardness of the repair compound of each of Examples 9-14 was evaluated using the testing protocols described above. The results of the density, solid percentage, and hardness of the repair compound are provided in Table 10 below.

TABLE 10

Density, Solid Percentage, and Surface Hardness of the Repair compound of Examples 15 and 16.

| Test | Example 15 | Example 16 |
|---|---|---|
| Density: lb/gallon | 3.02-3.07 | 3.07-3.1 |
| Solid % | 59.5% | 61.8% |

The overall performance of the repair compounds of Examples 15 and 16 were evaluated as follows. Two plaster boards of 12 inch×12 inch each having a 4.5 inch diameter hole were mounted onto a frame so they were in vertical position. The holes were filled with the repair compound of Examples 15 and 16, respectively. The repair compound was allowed to dry for 2 days (approximately 48 hours). A visual assessment of evidence of cracking, shrinking, and/or sagging was conducted. Then, both holes were sanded to assess their sanding performance properties.

The results of the testing was as follows. Neither of the repair compounds of Example 15 or 16 exhibited any visually identifiable evidence of cracking, shrinking, and/or sagging. The repair compound of Example 16 exhibited excellent blending with the wall surface/color. The Example 16 repair compound was virtually impossible to detect whereas the Example 15 repair compound was slightly visually detectable on the wall. Both of the Example 15 and Example 16 repair compounds exhibited the same excellent surface hardness (which was evaluated using the surface hardness testing protocol described above).

The performance of the repair compounds of Examples 15 and 16 were also evaluated on a wood surface as follows. One oak board/panel was prepared to include holes with a diameter ranging from ¼ inch to ¾ inch. The holes were filled with the repair compound of Example 16. One pine board/panel was prepared to include holes with a diameter ranging from ¼ inch to ¾ inch. The holes were filled with the repair compound of Example 16. The repair compound was permitted to dry for approximately 2 days (48 hours) and the board/panel and compound were then sanded using a sand sponge (coarse-fine grade obtained from 3M Company). The surface on both panels looked smooth, visually indicated no shrinking of the repair compound, and exhibited no visually identifiable cracking.

The repair compounds of the present disclosure provide a marked improvement over previous spackle or joint repair compounds, particularly in the context of large hole wall repair. In some embodiments, the use of fibers (optionally hydrophobic and hydrophilic fibers of different morphologies) in combination with an appropriate thickener (e.g., HASE-type thickener or other thickener without cellulosic or clay) provides desirable pseudoplastic-type behavior. In some embodiments, the use of a bimodal distribution of hollow glass microspheres from two different strength/size curves desirably renders the repair compound lightweight.

The recitation of all numerical ranges by endpoint is meant to include all numbers subsumed within the range (i.e., the range 1 to 10 includes, for example, 1, 1.5, 3.33, and 10).

The patents, patent documents, and patent applications cited herein are incorporated by reference in their entirety as if each were individually incorporated by reference. It will be apparent to those of ordinary skill in the art that various changes and modifications may be made without deviating from the inventing concepts set from above. Thus, the scope of the present disclosure should not be limited to the structures described herein. Those having skill in the art will appreciate that many changes may be made to the details of the above-described embodiments and implementations without departing from the underlying principles thereof. Further, various modifications and alterations of the present invention will become apparent to those skilled in the art without departing from the spirit and scope of the invention. The scope of the present application should, therefore, be determined only by the following claims and equivalents thereof.

What is claimed is:

1. A repair compound comprising:
a latex resin or resin binder;
a thickener;
hydrophobic fibrillated fibers and hydrophilic fibers, wherein the hydrophobic fibrillated fibers and hydrophilic fibers are synthetic fibers, and wherein the hydrophobic fibrillated fibers have a nominal length and the hydrophilic fibers have a nominal length and the hydrophobic fibrillated fiber nominal length is less than the hydrophilic fiber nominal length; and
a filler material;
wherein the repair compound exhibits pseudoplastic behavior and has a density of not greater than 4.0 lbs/gal.

2. The repair compound of claim 1, wherein the latex resin or resin binder is 100% acrylate.

3. The repair compound of claim 1, wherein the thickener includes at least one of polyethylene glycol, polyethylene oxide, polyethylene oxide/polypropylene oxide copolymers, polyvinyl alcohol, polymers or copolymers of ethylenically unsaturated carboxylic acids and their derivatives, guar gum, xanthan gum, alginates, tragacanth gum, pectin, amylopectin, dextran, polydextrose, and polysaccharides and derivatives thereof.

4. The repair compound of claim 1, wherein the thickener is a hydrophilic alkali swellable emulsion present in an amount of about 1% by weight or less.

5. The repair compound of claim 1, wherein each of the hydrophobic fibrillated fibers and hydrophilic fibers are present in an amount of less than about 1 percent by weight of the total compound.

6. The repair compound of claim 1, wherein the hydrophobic fibrillated fiber nominal length is at least 10 times less than the hydrophilic fiber nominal length.

7. The repair compound of claim 1, wherein the hydrophobic fibrillated fibers include polyethylene fibers, the hydrophilic fibers include rayon fibers, or both.

8. The repair compound of claim 1, wherein the filler material includes a synthetic inorganic filler.

9. The repair compound of claim 8, wherein the synthetic inorganic filler comprises a bimodal particle size mixture of larger synthetic inorganic filler particles and smaller synthetic inorganic filler particles, the mixture having a particle size ratio of larger size synthetic inorganic filler particles to smaller size synthetic inorganic filler particles of at least about 5:1.

10. The repair compound of claim 8, wherein the synthetic inorganic filler is comprised of substantially spherical particles.

11. The repair compound of claim 10, wherein the substantially spherical particles are glass bubbles.

12. The repair compound of claim 1, wherein the repair compound further comprises titanium dioxide present in an amount of between about 5% by weight and about 20% by weight.

13. A repair compound comprising:
a latex resin or resin binder;
a thickener including a hydrophilic alkali swellable emulsion present in an amount of about 1% by weight of less;
hydrophobic fibrillated synthetic fibers and hydrophilic synthetic fibers; and
filler material including synthetic inorganic filler, wherein the hydrophobic fibrillated synthetic fibers have a nominal length and the hydrophilic synthetic fibers have a nominal length and the hydrophobic fibrillated fiber nominal length is less than the hydrophilic fiber nominal length;
and the repair compound exhibits pseudoplastic behavior and has a density of not greater than 4.0 lbs/gal.

14. The repair compound of claim 13, wherein the hydrophobic fibrillated synthetic fibers include polyethylene fibers, the hydrophilic synthetic fibers include rayon fibers, or both.

15. The repair compound of claim 14, wherein the hydrophobic fibrillated synthetic fibers include polyethylene fiber and the hydrophilic synthetic fibers include rayon fibers.

16. The repair compound of claim 13, wherein the latex resin or resin binder is one of a vinyl acrylic polymer or copolymer, an acrylic polymer or copolymer, an acrylate polymer or copolymer, a polyvinyl acetate polymer or copolymer, an ethylene vinyl acetate polymer or copolymer, a styrene-butadiene polymer or copolymer, a polyacrylamide polymer or copolymer, a natural rubber latex, a natural starch, a synthetic starch, and casein.

17. The repair compound of claim 13, wherein the repair compound further comprises a pH control agent and an organic ether smoothing agent.

18. The repair compound of claim 13, wherein the filler material comprises a bimodal particle size mixture of larger synthetic inorganic filler particles and smaller synthetic inorganic filler particles, and wherein the larger and smaller synthetic inorganic filler particles are glass bubbles.

* * * * *

UNITED STATES PATENT AND TRADEMARK OFFICE
CERTIFICATE OF CORRECTION

| | |
|---|---|
| PATENT NO. | : 10,894,742 B2 |
| APPLICATION NO. | : 16/375435 |
| DATED | : January 19, 2021 |
| INVENTOR(S) | : John Gozum |

Page 1 of 1

It is certified that error appears in the above-identified patent and that said Letters Patent is hereby corrected as shown below:

In the Claims

Column 20, Line 36, delete "of" 2nd occurrence and insert -- or --

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*